W. KOHLMEIER.
SELF FEEDER FOR ALFALFA HAY FOR HOGS.
APPLICATION FILED APR. 5, 1917.

1,234,349.

Patented July 24, 1917.

Inventor
W. Kohlmeier,

Witness

By
Attorney

UNITED STATES PATENT OFFICE.

WILLIAM KOHLMEIER, OF LYONS, NEBRASKA.

SELF-FEEDER FOR ALFALFA HAY FOR HOGS.

1,234,349.   Specification of Letters Patent.   Patented July 24, 1917.

Application filed April 5, 1917.   Serial No. 159,945.

*To all whom it may concern:*

Be it known that I, WILLIAM KOHLMEIER, a citizen of the United States, residing at Lyons, in the county of Burt and State of Nebraska, have invented a new and useful Self-Feeder for Alfalfa Hay for Hogs, of which the following is a specification.

This invention relates to animal feeding devices.

The primary object of the invention is to provide an improved animal feeder adapted to dispense substantially uniform quantities of feed from a container to a feed trough in order that undue waste may be prevented while sufficient food always remains within reach of the animal.

A coördinate object of my invention contemplates an animal actuated device for automatically replenishing the food supply in the trough.

Another object of my invention is to effect improvements in the means for feeding and discharging a food from the container to the dispenser or trough.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

Figure 1:
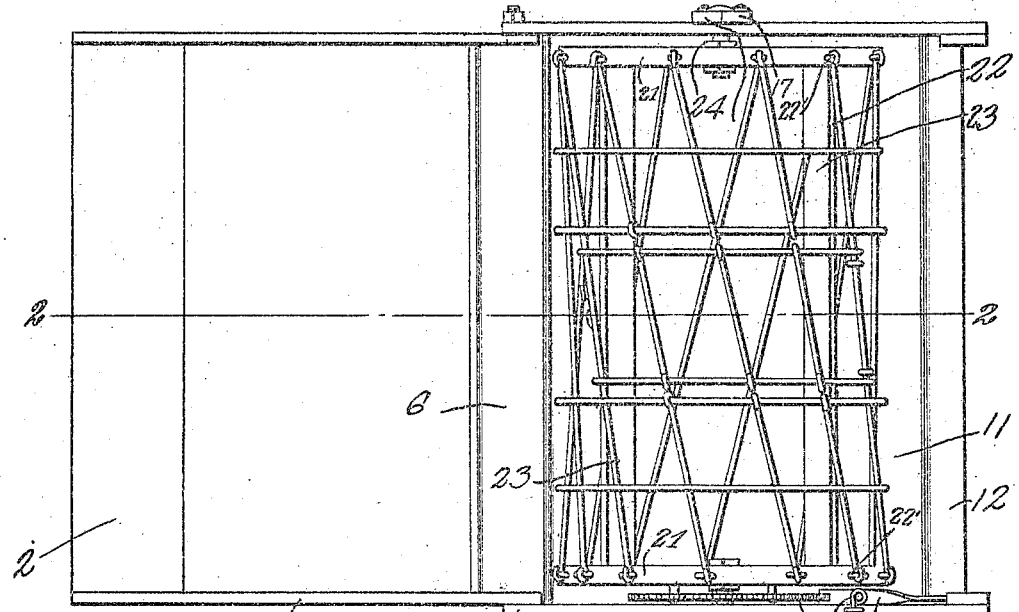
Figure 1 is a plan view of the invention.

Referring now more particularly to the accompanying drawings, 1 indicates what is termed a combined approach, trough and container. The approach 2 is disposed in an inclined plane, and is supported at its lower extremity by the end 3.

Rigidly mounted in the approach sides 4 is a strip 5, to which is securely attached the trough 6. The terminal of the trough is preferably attached to the strip 5 by nails or the like. The trough 6 is semi-cylindrical and formed by bending downwardly the sheet metal, or other material used in its construction, and passing same over an intermediate supporting strip 8, which is securely fastened to side supports 9, as is clearly illustrated in Fig. 1. The container 11 is an extension of the material forming the trough 6, and is also semi-cylindrical, the sheet metal forming the same being extended downwardly as is illustrated in Fig. 2.

In order to hold the terminal 12 securely in position, a strip 13 is secured to the supports 9. The sides of the trough and container are closed by the side supports.

Securely carried intermediate the extremities of container supports 9 are the vertical bearing members 16. Said bearing members each comprise two sections, one of which sections designated by 17 is pivotally connected to the side support in the manner illustrated at 18. Portions of the lower extremity of section 17 are cut away or beveled to allow free movement of the same.

Adjacent the upper extremities of the bearing members 16 and in alinement with each other are circular openings 19 formed by registration of arcuate recesses in the two sections thereof. Said openings 19 are adapted to serve as supports for a cage generally designated by 20.

Figure 2:
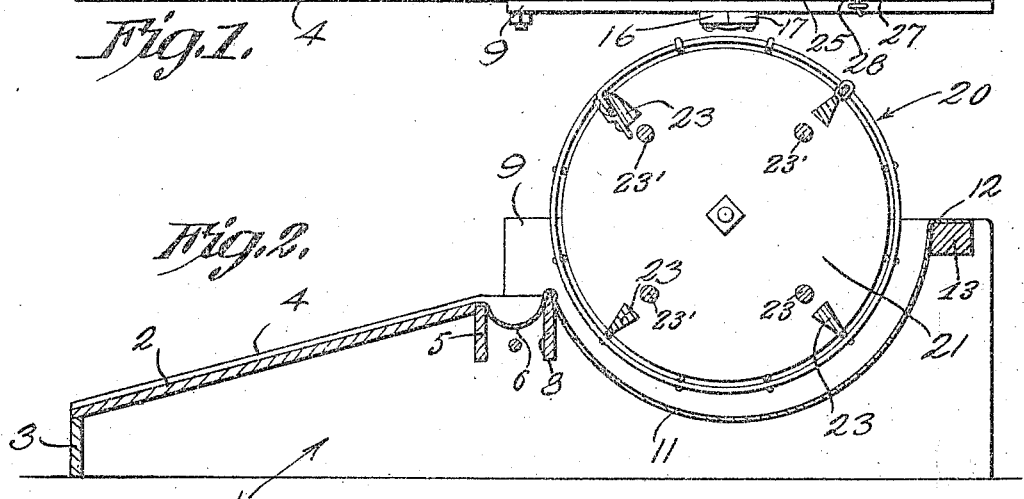
Fig. 2 is a section on the line 2—2 of Fig. 1 showing to advantage the relative position and arrangement of its various parts.
Figure 3:
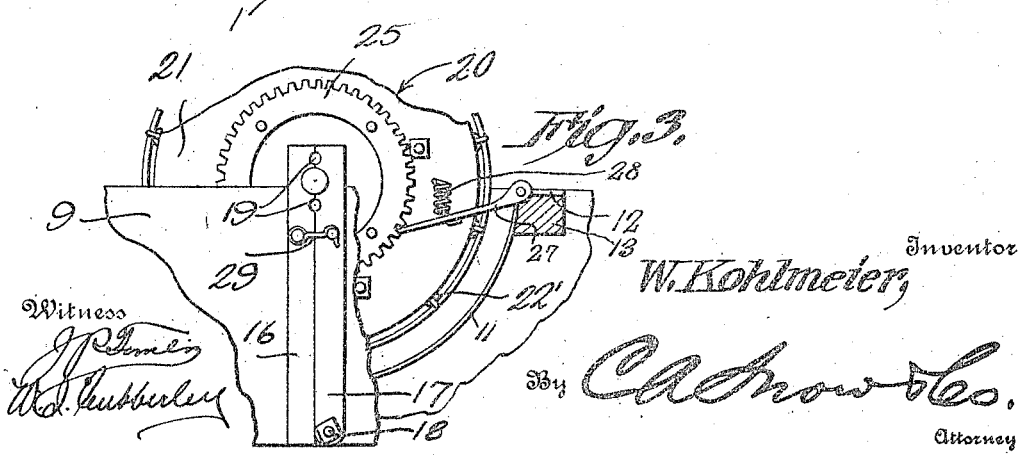
Fig. 3 is a view of the ratchet mechanism used in connection with the improved cage.

The cage 20 comprises solid circular ends or heads 21 connected by obliquely disposed rods 22, which are disposed in spaced relationship to each other upon the peripheries of the heads, and may be secured in any desired manner, but preferably by bending the terminal ends about staples 22', as is clearly illustrated in Fig. 1. At intervals within the periphery of the end pieces 21 are mounted the blades or cleats 23, which are preferably triangular in cross section as is shown in Fig. 2, and are secured in any suitable manner within the said ends 21. Upon rotation of the cage the said blades are adapted to transfer the food stuffs from the container to the trough. Rods 23' may be employed to tie the heads together.

By means of opposed trunnions 24 the cage is revolubly mounted within the openings 19 in the bearings 16. In order to prevent reverse movement of the cage 20, a ratchet 25 is fastened to and spaced from one of the heads of the cage. A pawl 27 movably carried by rod 13 is held normally in engagement with the ratchet teeth by means of the coil spring 28 and prevents the reverse movement heretofore mentioned.

The operation of my invention is as follows:

The animal ascending the approach 2, partakes of food in the trough 6, and having consumed the same, endeavors to reach the extra supply stored within the container. In so doing, the drum is revolved through engagement by one of the rods 22 with the head of the animal, and one of the blades 23 is revolved until the food stuff resting thereon is elevated above and close to the trough, whereupon it will gravitate into the trough. As the texture of food stuffs vary, it is often necessary to readjust the cage with reference to the inner periphery of the container. To this end there is provided the openings 19 before mentioned. For coarser material, it is advisable to mount the cage within the upper bearings. With food stuffs of finer texture, it has been found desirable to mount the cage within the lower bearings. The two sections of the bearings are held together by means of hooks or other securing members 29. Attention is called to the fact that the free extremities of the container 11 and its supporting strip 13 are located in horizontal alinement with the axis of rotation of the cage 21.

Having thus described the invention, what is claimed as new is:

1. The combination with side supports of a container formed of a single length of sheet metal, a trough formed of a continuation of the length of sheet metal forming said container, a cage extending within the container, means within the cage for transferring feed from the container to the trough, and means carried by the cage for engagement with the head of an animal for rotating the cage.

2. The combination with side supports of a container formed of a single length of sheet metal, a trough integral with said container and formed of a continuation of the length of sheet metal forming said container, a cage extending within the container, means within the cage for elevating feed close to and above the trough, said means being inclined to allow the elevated feed to gravitate into the trough, and means carried by the cage for engagement with the head of a feeding animal for rotating the cage.

In testimony that I claim the foregoing as my own, I have hereto affixed my signature in the presence of two witnesses.

WILLIAM KOHLMEIER.

Witnesses:
WILLIAM L. MILLER,
A. J. WHITE.

Copies of this patent may be obtained for five cents each, by addressing the "Commissioner of Patents, Washington, D. C."